US009058037B2

(12) United States Patent
Drake et al.

(10) Patent No.: US 9,058,037 B2
(45) Date of Patent: Jun. 16, 2015

(54) RETURN OF APPLIANCE STATE AFTER DEMAND RESPONSE EVENT

(75) Inventors: Jeff Donald Drake, Louisville, KY (US); Timothy Dale Worthington, Louisville, KY (US); Michael F. Finch, Louisville, KY (US); John K. Besore, Louisville, KY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 493 days.

(21) Appl. No.: 12/644,663

(22) Filed: Dec. 22, 2009

(65) Prior Publication Data

US 2011/0153110 A1 Jun. 23, 2011

(51) Int. Cl.
*G05B 23/02* (2006.01)
*A47L 15/00* (2006.01)
*D06F 33/02* (2006.01)
*D06F 35/00* (2006.01)
*H02J 3/14* (2006.01)

(52) U.S. Cl.
CPC ........... *G05B 23/0235* (2013.01); *Y04S 20/224* (2013.01); *Y04S 20/222* (2013.01); *H02J 2003/146* (2013.01); *A47L 15/0047* (2013.01); *A47L 15/0063* (2013.01); *A47L 2301/08* (2013.01); *A47L 2401/20* (2013.01); *A47L 2401/30* (2013.01); *A47L 2401/34* (2013.01); *A47L 2501/34* (2013.01); *D06F 33/02* (2013.01); *D06F 35/005* (2013.01)

(58) Field of Classification Search
USPC .................... 700/286, 291, 295, 297; 702/57; 713/310, 320, 340
See application file for complete search history.

(56) References Cited

U.S. PATENT DOCUMENTS

| 5,924,486 | A * | 7/1999 | Ehlers et al. ................... 165/238 |
| 6,167,389 | A * | 12/2000 | Davis et al. ................... 705/412 |
| 6,216,956 | B1 * | 4/2001 | Ehlers et al. ..................... 236/47 |
| 6,975,958 | B2 * | 12/2005 | Bohrer et al. ................. 702/130 |
| 7,010,363 | B2 | 3/2006 | Donnelly et al. |
| 7,079,967 | B2 | 7/2006 | Rossi et al. |
| 7,873,441 | B2 * | 1/2011 | Synesiou et al. .............. 700/286 |
| 8,010,812 | B2 * | 8/2011 | Forbes et al. ................. 713/300 |
| 2003/0178894 | A1 * | 9/2003 | Ghent ........................... 307/140 |
| 2003/0233201 | A1 * | 12/2003 | Horst et al. ..................... 702/62 |
| 2004/0024483 | A1 * | 2/2004 | Holcombe ..................... 700/122 |
| 2004/0153170 | A1 * | 8/2004 | Santacatterina et al. .......... 700/1 |
| 2006/0033812 | A1 * | 2/2006 | Yoshida et al. ............ 348/14.01 |
| 2006/0229768 | A1 * | 10/2006 | Chassin et al. ................ 700/295 |
| 2008/0167756 | A1 * | 7/2008 | Golden et al. ................ 700/297 |

(Continued)

*Primary Examiner* — Darrin Dunn
(74) *Attorney, Agent, or Firm* — GE Global Patent Operation; Marc A. Vivenzio

(57) ABSTRACT

In another aspect of the disclosure, a method of controlling an appliance is provided comprising establishing settings on an appliance related to threshold variables, wherein the settings include the threshold variables for determining a reaction of the appliance in response to reaching one or more of the threshold variables. The method further comprises sending a signal from an associated utility to the appliance, wherein the appliance includes a controller in signal communication with the associated utility. The controller receives and processes a signal from the associated utility, and converts and compares the signal to the threshold variables. The method still further comprises changing the operating of the appliance from a first state of operation to a second state of operation, wherein in the second state of operation one or more power consuming functions of the appliance are based on the comparison of the signal to the threshold variables and, returning the appliance to the first state of operation.

4 Claims, 2 Drawing Sheets

(56) References Cited

U.S. PATENT DOCUMENTS

| | | | |
|---|---|---|---|
| 2008/0220300 A1* | 9/2008 | Jones et al. | 429/23 |
| 2008/0315000 A1 | 12/2008 | Gorthala et al. | |
| 2009/0077397 A1* | 3/2009 | Shnekendorf et al. | 713/310 |
| 2009/0132070 A1* | 5/2009 | Ebrom et al. | 700/90 |
| 2009/0187499 A1* | 7/2009 | Mulder et al. | 705/30 |
| 2009/0292402 A1* | 11/2009 | Cruickshank, III | 700/287 |
| 2009/0326729 A1* | 12/2009 | Hakim et al. | 700/295 |
| 2010/0088261 A1* | 4/2010 | Montalvo | 706/15 |
| 2010/0138363 A1* | 6/2010 | Batterberry et al. | 705/412 |
| 2010/0217450 A1* | 8/2010 | Beal et al. | 700/291 |
| 2010/0250590 A1* | 9/2010 | Galvin | 707/770 |
| 2010/0262311 A1* | 10/2010 | Santacatterina et al. | 700/291 |
| 2011/0054710 A1* | 3/2011 | Imes et al. | 700/286 |

* cited by examiner

RETURN OF APPLIANCE STATE AFTER DEMAND RESPONSE EVENT

BACKGROUND

This disclosure relates to energy management, and more particularly to electrical device control methods and electrical energy consumption systems. The disclosure finds particular application to energy management of home appliances, for example, dishwashers, clothes washers, dryers, HVAC systems, etc.

Many utilities are currently experiencing a shortage of electric generating capacity due to increasing consumer demand for electricity. Currently utilities generally charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened. In order to reduce high peak power demand, many utilities have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a user must manually operate power consuming devices during the off-peak times. This is undesirable because a consumer may not always be present in the home to operate the devices during off-peak hours. This is also undesirable because the consumer is required to manually track the current time to determine what hours are off-peak and on-peak.

One proposed third party solution is to provide a system where a controller "switches" the actual energy supply to the power consuming device on and off. However, there is no active control beyond the mere on/off switching. There are also currently different methods used to determine when variable electricity-pricing schemes go into effect. There are phone lines, schedules, and wireless signals sent by the electrical utility company. One difficulty is that different electrical companies use different methods of communicating periods of high electrical demand to their consumers. Other electrical utility companies simply have rate schedules for different times of day.

Therefore, there is a need to provide a system that can automatically operate power consuming devices during off-peak hours in order to reduce consumer's electric bills and also to reduce the load on generating plants during on-peak hours.

BRIEF DESCRIPTION

The present disclosure reduces power consumption by reducing the energy demand on the power generation facility, and also enabling the user/consumer to pay less to operate appliances on an annual basis.

One advantage of this approach is that customers have complete control of their power. There have been proposals by utilities to shut off customers if they exceed demand limits or increase the number of rolling brownouts. The proposed method also gives a customer finer granularity in their home in terms of control. A customer does not have to load shed a room, or load shed completely an appliance, in order to manage energy savings of a single device.

This disclosure also advantageously provides modes of load shedding in appliances, lighting, or HVAC other than "on/off" to make the situation more acceptable from the perspective of the customer.

In one aspect of the disclosure, an appliance controller is provided comprising an appliance including settings to respond to cost of energy. The settings can include one or more threshold variables for determining a reaction of the appliance in response to reaching the one or more threshold variables. A signal from an associated utility is communicated to the appliance, wherein the appliance includes a controller in signal communication with the associated utility. The controller receives and processes the signal from the associated utility wherein the signal is compared to the one or more threshold variables. The appliance operation changes from a first state of operation to a second state of operation in response to the cost of energy sent from the utility, wherein in the second state of operation one or more power consuming functions are based on the comparison of the signal to the one or more threshold variables.

In another aspect of the disclosure, a method of controlling an appliance is provided comprising establishing settings on an appliance related to threshold variables, wherein the settings include the threshold variables for determining a reaction of the appliance in response to reaching one or more of the threshold variables. The method further comprises sending a signal from an associated utility to the appliance, wherein the appliance includes a controller in signal communication with the associated utility. The controller receives and processes a signal from the associated utility, and converts and compares the signal to the threshold variables. The method still further comprises changing the operating of the appliance from a first state of operation to a second state of operation, wherein in the second state of operation one or more power consuming functions of the appliance are based on the comparison of the signal to the threshold variables and, returning the appliance to the first state of operation.

In still a further aspect of the disclosure, a method of controlling an appliance is provided comprising: establishing settings on the appliance related to threshold variables wherein the settings include the threshold variables for determining a reaction of the appliance in response to reaching one or more of the threshold variables; sending a signal from an associated utility to the appliance, wherein the appliance includes a controller in signal communication with the associated utility wherein the controller receives and processes a signal from the associated utility; converting and comparing the signal to the threshold variables; and, switching the operating of the appliance between a first state of operation and a second state of operation, wherein in the second state of operation one or more power consuming functions of the appliance are based on the comparison of the signal to the threshold variables.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting the cost of the appliance, opening up appliances to a variety of protocols, enabling demand side management or energy management, providing for a standard interface to the appliance (for example, offering prechill and/or temperature set change during on-peak hours), and/or returning an appliance to a prior or previous functional state.

Still other features and benefits of the present disclosure will become apparent from reading and understanding the following detailed description.

DETAILED DESCRIPTION

Figure 1:
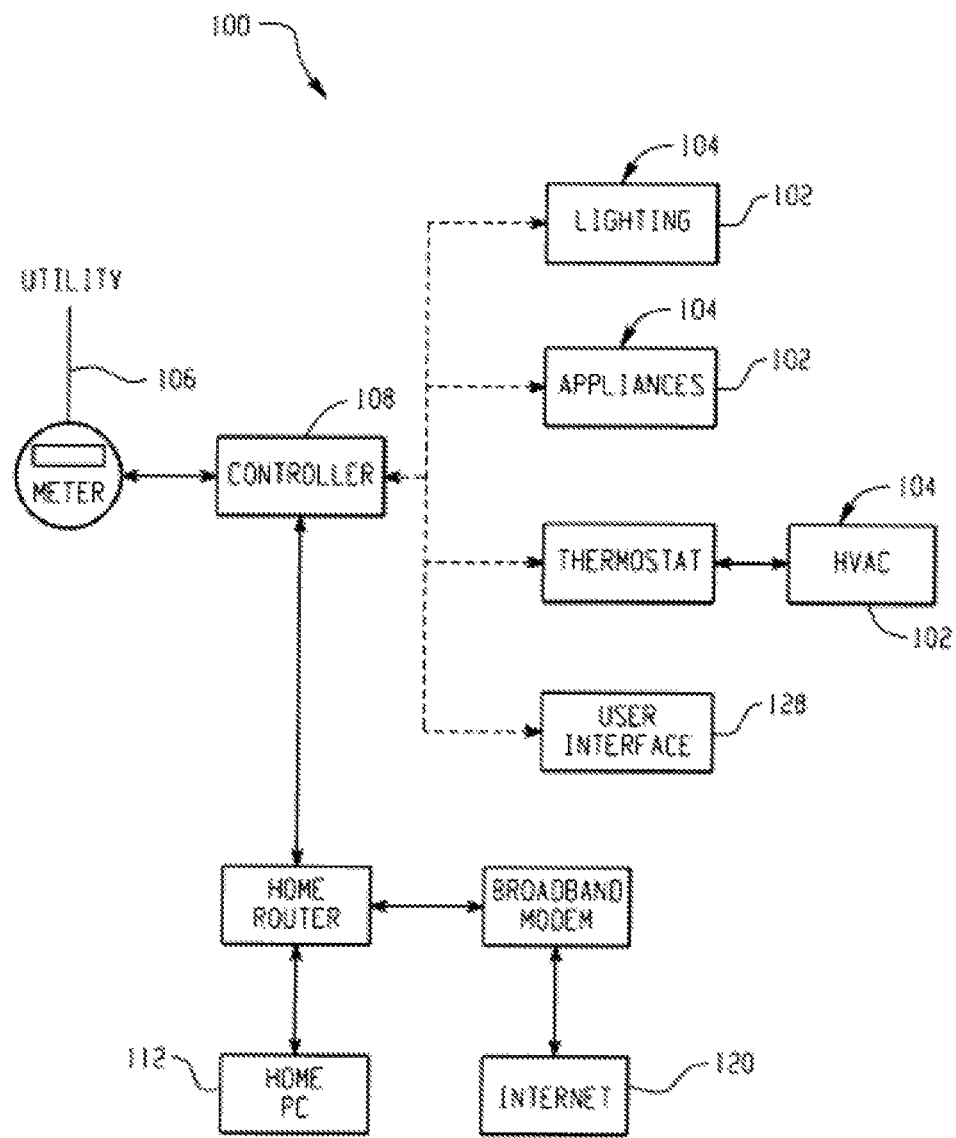
FIG. 1 illustrates an exemplary embodiment of an energy management system for household appliances.

In one embodiment, a home energy management system (HEM) is provided to handle energy management between the utility and the homeowner's appliances. The system can include one or more of the following: a controller, utility meter, communication network, intelligent appliances, local storage, local generator and/or demand server. Some systems may actually allow the appliance to "communicate directly with the utility meter or mesh network through a demand side management module (DSMM). The demand server can be a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller can notify the intelligent appliances, lighting and thermostat/HVAC.

Each intelligent appliance can have a communication interface that links itself to the HEM and a controller. This interface can be power-line carrier, wireless, and/or wired. The controller will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer. Likewise, consideration to use of local energy storage and use of a local generator to offset peak demand limit can be incorporated into the energy management considerations, or provide the ability to override mode of energy savings through the controller or at the appliance, lighting, or thermostat/HVAC.

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand and/or in a demand response (DR) setting is based on priority of the device and the energy need level. If the appliance's priority is high, then the appliance will most likely not go into an energy saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 MHz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

The user interface can also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation.

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption. The features, to be described hereinafter, enable the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance.

Although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature that the controller lends itself to is the inclusion of "Remote diagnostics". This feature would allow the appliance to send a signal or message to the controller indicating that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

An exemplary embodiment of a home energy management system 100 having one or managed appliances 102 is schematically illustrated in FIG. 1. The appliances 102 each comprise at least one power consuming feature/function 104. The home energy management system (HEM) 100 is operatively associated with the power consuming features/functions 104. The HEM 100 can include a controller or micro computer 108 which is programmed to selectively control the energization of the power consuming features/functions 104. The HEM 100 is configured to receive and process a signal 106 from an associated utility, whereby the HEM 100, through the controller 108, is in signal communication with the associated utility. The controller 108 is configured to receive and process the signal 106 from the associated utility. The HEM 100 can convert the signal 106 through a series of variables and compare to a series of demand response (DR) threshold variables. The appliance can be operated including the one or more power consuming functions based on the comparison of the converted signal to the demand response threshold variables.

Figure 2:
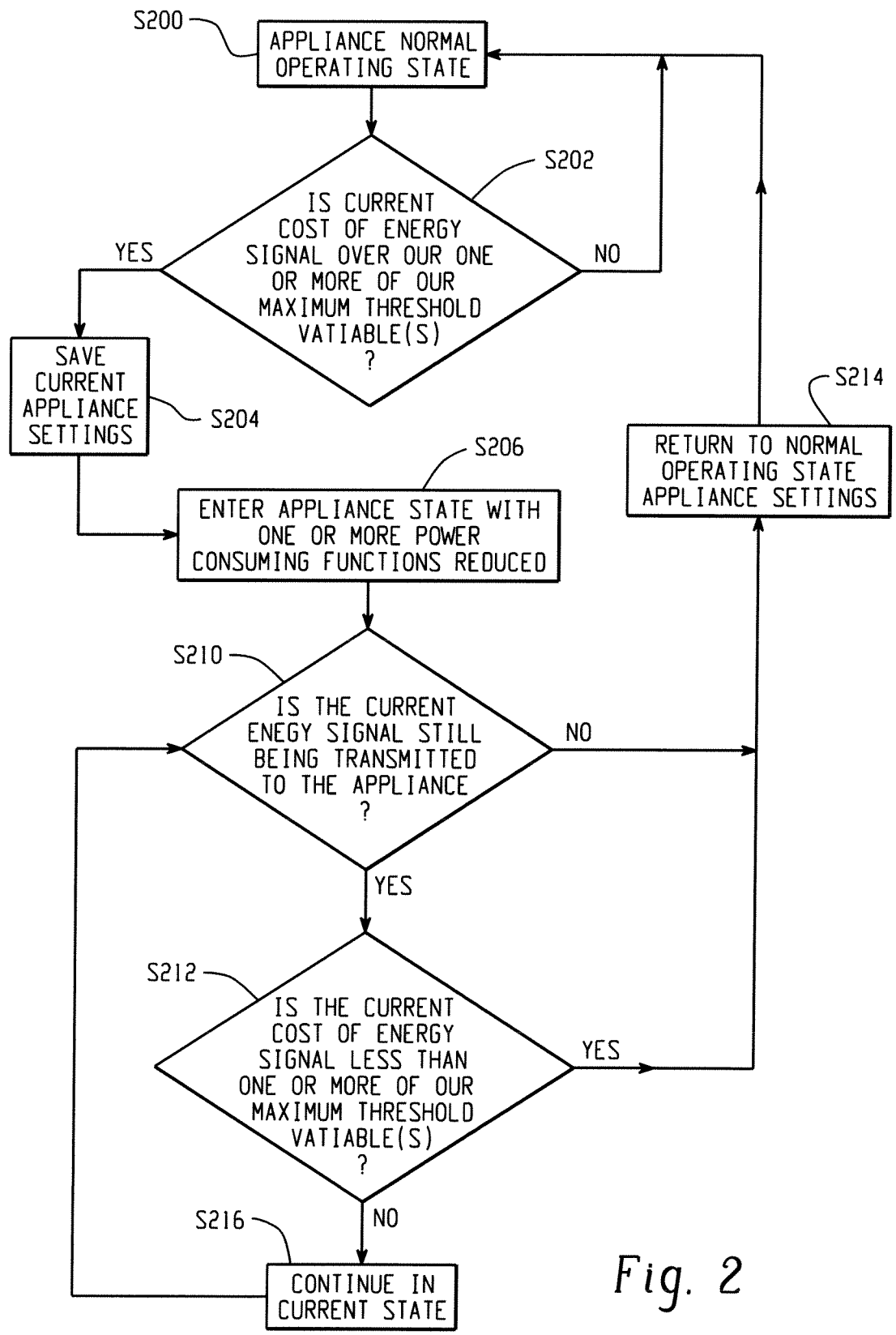
FIG. 2 illustrates an exemplary operational flow chart of managing an appliance based on one exemplary threshold variable and illustrates a return to a previous, prior, or 'normal' appliance state after a demand response event and/or signal interruption.

Referring to FIG. 2, the HEM can operate one or more associated appliances along with respective one or more power consuming functions, selectively when the comparison of the converted signals are within the DR threshold variable parameters. The DR threshold variables or parameters can be established by a user. The threshold variables can comprise the group of variables including dollars per kilowatt hour, carbon usage, maximum criticality level of demand, minimum criticality level of demand, price tiers, et. al.

The controller can operate the appliance in one of a normal operating mode and in one or more power consuming functions based on comparisons of converted signals relative to the DR threshold variables. The appliance can include a DR module for receiving signals from the HEM controller wherein receiving the signals includes a USB interface, wireless module, power line carrier, and/or web based application. As one illustrative example, if the converted signal to the HEM results in a dollar per kilowatt hour that is less than an established threshold dollar per kilowatt hour, then the HEM will process a signal to the associated appliance to operate the one or more power consuming functions connected with the respective appliance.

The present disclosure demonstrates a method wherein a user can change and update their appliance DR settings, how it reacts to a utility signal or lack thereof, what features or modules on the appliance are affected by the utility signal, and more. Appliances without a full interactive user interface can be troublesome to have the ability to update this information from the consumer aspect. This disclosure allows the user to use, for example, a home PC in different ways to update the appliance DR settings so they can have more control over how their appliance reacts to utility signals, or absence thereof, sent on the grid.

Four (4) methods, to be described hereinafter, help the user update their DR settings on their appliance or appliance DR module. The DR settings include having the ability, for example, to change what Price Tiers the appliance reacts to, set currency price information for each appliance level of reaction (could set a maximum dollar amount of $ per KWHr the user would like the appliance to react, same goes for minimum amount), set carbon usage information for each appliance level of reaction (i.e. set a maximum carbon units the user would like the appliance to react, same goes for minimum amount), set maximum or minimum criticality levels of demand response the appliance reacts to, set what features or modules on the appliance that is affected at certain levels from the utility signal, set how an appliance reacts to future price rates, price tiers, criticality levels of demand response, carbon usage, lack of signal, etc.

One exemplary method can use a simple USB interface. The appliance or appliance DR module can contain a radio daughter board or slide out module that allows the user to remove the radio or DR module that receives or interprets the signals from the utility. If this radio daughter board or slide out module is directly inserted into the appliance then the daughter board itself can have a USB connection that can plug into a computer and update settings onto the module or daughter card. The consumer's, or user's, computer would have a program that will send the updated information to the daughter card or module and can be saved so the appliance can use the information. If the radio daughter board or slide out module is input into a DR module that is then attached to an appliance, then there could be a separate daughter card or module that could slide into the DR module that allows a USB connection to the computer. This USB module can then be used on any appliance the consumer has with DR capabilities. The same computer program would be used to update and change the DR settings on to the DR module for the appliance to use.

Another exemplary method can use a wireless interface to update the DR settings on the appliance or DR module attached to the appliance. One illustrative method can be described as follows. The user can use their computer with an attached wireless module connected to their computer (wireless methods can include many different methods, such as, Zigbee, WiFi, FM, FM RDS, Z Wave, 802.15.4 proprietary methods, Blue tooth, etc.) A means of attaching this wireless module would be to use a USB "stick" which is the wireless transmitter/receiver for the wireless network transmitting information to the appliance or DR module connected to the appliance. The wireless network used to transmit these DR settings could either be the same wireless network the utility is sending signals on or a completely separate network used specifically for transmitting these signals.

Still a further exemplary method can use a Power Line Carrier method (PLC). The user can use a PLC connection with their computer and update the DR settings on their appliance or DR module attached to their appliance. This PLC connection could be connected to the consumers' computer in a variety of ways, from their computer to their home LAN system to the PLC module, directly from their computer to the PLC module, etc. The data and DR settings could then be received by the appliance or DR module on the appliance via the PLC interface to the appliance or DR module on the appliance.

And still a further exemplary method can use an "internet" based connection to update the DR settings via the in home utility network that the utility is using to send the "signals" or information to the appliance or DR module on the appliance. An internet web server, web site, or general web based application can be accessed by the consumer's computer. The user can use this web server, web site, or web based application to change and update the DR settings on the appliance or DR module on the appliance. This information can be transmitted to the utility network and then sent to the appliance on the network. The appliance or DR module on the appliance would then receive the DR or pricing information from the utility.

With most appliances the user interface is limited and does not make it easy for a user to change DR settings that the appliance reacts to. Appliances can have a default reaction, or DR reaction, to all utility load control or price events and this gives the user the ability to create their own DR settings allowing them to change how the appliance reacts to the utility "signals", or absence thereof, or information given on the grid to appliances or load control devices. The DR settings also provide for an appliance response in the event of a lack of signal or 'lost' signal.

The above described methods allow appliances, through user selected controls and threshold variables, the ability to have DR settings that react to the utility signals, or lack thereof, but also give the user the ability to personalize how the appliance reacts to the utility information.

As one illustrative appliance, a dishwasher (DW) can be in communication with the HEM. HEM would be able to monitor the DW cycle selection. When placed in charge of the DW unit, HEM can set the default cycle selection (i.e. a second state of operation) to an energy cycle or auto wash cycle that uses less water and/or less cycle time. Other cycles can be disabled from unit selection and control and can be reserved for the HEM to change allowances to cycle selections.

Additionally, HEM can have the ability to drop or skip, for example, prewashes and rinses depending on feedback from the DW such as turbidity values, water temperature, running time, or other inputs. The cycle segments can be dropped or skipped when the input values meet certain levels of similar set values stored in the HEM. The above described methods provide a more active controlling of the unit and managing of the energy consumed by the unit through the HEM. This allows HEM to provide a benefit to the consumer by managing the energy consumption of the unit.

For water consuming appliances, heating the water provided to the unit accounts for a large portion of the energy consumed by the unit, therefore, limiting the number of fills to the unit will help reduce the total energy consumed. Key parameters, i.e. turbidity, can be assessed by HEM to make sure a certain level of performance is maintained while conserving energy and limiting the number of fills.

For appliances that run as needed, a user can selectively determine how long until the output (i.e. dishes, clothes, etc.) is needed. If, for example, dishes are not needed for an extended period after last rinse cycle, then the HEM can determine how much calrod usage is needed to dry dishes if "Heated Dry" selected. If user indicates that dishes are not needed until the next day (i.e. overnight), it is possible no calrod 'on' time is required. The dishwasher electronic control software can execute an energy saving cycle if it receives information (due to user input) that the user will not need the dishes for a long period of time. For example, if the user is going to start the dishwasher before going to bed and selects the key letting the dishwasher control know that the dishes are going to remain in the dishwasher overnight, then the dishwasher can reduce or eliminate calrod usage during the dry portion of the cycle and possibly during the rinse portion as well.

Thus, if the user is not going to open the door for a long period of time, then using the calrod to dry the dishes may just be using energy that is not required. The concept of the user entering that information on the controller or HEM and using that information to reduce energy usage can provide an advantage for the product.

As described above, appliances can be delayed in their operation, rescheduled for a later start time, and/or altered in their functioning/features in order to reduce energy demands. Some appliances lend themselves to an altered operation due to their functionality. For example, dishwashers, clothes washers, and clothes dryers all have the capacity to run as needed because demand on these appliances is either not constant and/or the functions of these appliances are such that immediate response is not necessary. As one illustrative example, a dishwasher that has been loaded during the daytime, i.e., on-peak demand period hours, can be programmed to start its operations for a later, albeit off-peak demand hours. It is to be appreciated that on-peak and off-peak demand hours can correspond to high utility costs and relatively low utility costs ($/kilowatt), respectively.

A control method in accordance with the present disclosure comprises communicating with an associated utility and receiving and processing the signal indicative of at least one threshold variable, determining a current value in relation to the one threshold variable, operating the appliance in a first operating mode during one period relative to a first comparison between the current value and the threshold variable, operating the appliance in a second operating mode during another period relative to a second comparison between the current value and the threshold variable, selectively adjusting any number of one or more power consuming features/functions of the appliance to adjust power consumption of the appliance in the second operating mode, and returning to the first operating mode after the threshold variable is over or the energy signal is missing. The selective adjustment can include adjusting power in the second operating mode, for example, selecting one or more of the operational adjustments described above.

Referring again to FIG. 2 wherein a flow chart is displayed for controlling an appliance. From an appliance normal operating state (or first state of operation) (S200) a decision can be presented, namely, is the current cost of energy signal over or greater than one or more of the maximum threshold variables (S202). If the answer is affirmative, the current appliance settings (i.e. first state) can be saved (S204) and then the appliance settings can be subjected to modified or savings settings (S206). The modified settings provide for entering the appliance into a state, i.e. a second state, including one or more power consuming functions. In particular, in the second state the amount of energy to the one or more power consuming functions is reduced. If the current energy signal is still being transmitted to the appliance (S210) and if the current cost of energy is less than one or more of the maximum threshold variables (S212), then the appliance can be returned to a normal operating state (S214) including normal or a first operating appliance settings. If the current cost of energy is more than one or more of the maximum threshold variables, the appliance continues to operate in the second state (S216) including one or more power consuming functions in a reduced energy consumption mode. Once this event is finished or has dropped to a lower price or criticality level, or if the signal stops transmitting to the appliance, the appliance will then return all of its settings back to the previous settings, or first state, before the DR event or price threshold, for example, occurred.

The appliance controller can comprise an appliance having settings that respond to cost of energy. The settings can include threshold variables or maximum limit variables for determining a reaction of the appliance in response to reaching one or more of the threshold variables. A signal from an associated utility to the appliance, wherein the appliance includes a controller in signal communication with the associated utility can encompass the controller for receiving and processing a signal from the associated utility. The signal can be compared to the demand response threshold variables and the appliance operation changes can then be altered from a first state of operation to a second state of operation in response to the cost of energy sent from the utility. In the second state of operation the one or more power consuming functions are based on the comparison of the signal to the one or more threshold variables. A home energy management system can be used for managing the threshold variables and for routing the signal from the utility to the appliance grid. It is to be appreciated, that the first state of operation can exclude any settings changes due to the cost of energy. The first state of operation can be initiated when the current cost of power is less than a demand response cost of power threshold.

Returning to the first state of operation, from an altered state of operation, can be initiated when the signal from the utility is no longer being communicated (i.e. power interruption, signal 'lost', communication compromised, etc.) to the appliance. Returning to the first state of operation can be delayed for a period of time after the utility signals are no longer being communicated to the appliance. The delayed period of time can be selected by a user and/or the delayed period of time can be random. The threshold variables can be determined by a user and are typically selected from the variables comprising price of energy, carbon usage, maximum or minimum criticality level of demand, and a price tier number associated with the current cost of energy. The user can interact with the appliance over an RF communication from a computer. Alternatively, the interaction can include a USB communication, an Internet and/or an Internet server.

As one illustrative example, a clothes washer can have one or more DR events that enable the clothes washer to modify functions (i.e. to the second state of operation) such as, change the water temperature setting, change the bulk dispense setting, change heater duty cycle times, change ability to use heater, change motor duty cycle, etc. When the DR event has finished or the signal to the appliance is lost, the unit can then return back to the water temperature setting that was set by the user before the event, return the bulk dispense settings, return the heater duty cycle, return the ability to use the heater, and return the motor duty cycle. It is to be appreciated that returning the settings back can include a return to 'normal' or average settings, a return to preprogrammed or a return to pre-DR settings, or a return to other user selectable default settings, i.e. first state of operation.

As another illustrative example, a clothes dryer can have one or more DR events that enable the clothes dryer to modify functions (i.e. to the second state of operation) such as, reduce the heat setting on the unit (this includes reducing the number of heaters used, heater duty cycle, etc.), turn off the heater(s), change from timed dry to sensor dry cycles, change from sensor dry to timed dry cycles, etc. When the DR event has finished or the signal to the appliance is lost, the unit can then return back to the user settings the user selected when the cycle was started. Returning the settings can include returning to the previous heater setting, turning back ON the heater (s), changing back from timed dry to sensor dry, changing back from sensor dry to timed dry, etc., i.e. first state of operation.

As still another illustrative example, a dishwasher can have one or more DR events that enable the dishwasher to modify functions (i.e. to the second state of operation) such as, reduce duty cycle of heater during wash, reduce duty cycle of heater during dry, disable any options selected, change to an ECO cycle, etc. When the DR event has finished or the signal to the appliance is lost, the unit can return back to the previous user settings the user selected when the cycle started. Returning the settings can include a return to the previous or original heater duty cycle during wash, a return to original heater duty cycle during dry, enable any options that were disabled, a return back to a functional cycle that was selected before the DR event, or a return to a first state or operation.

The return to the first state of operation or original settings can also include a time delay or preselected period of time. In this manner, if power signal is lost, or DR event changes for all appliances, then all of the appliances can at different time restore or return functions to the first state of operation such that the appliances are staggered to their return to their respective first states of operation.

The disclosure has been described with reference to the preferred embodiments. Obviously, modifications and alterations will occur to others upon reading and understanding the preceding detailed description. It is intended that the disclosure be construed as including all such modifications and alterations.

What is claimed is:

1. A home energy management system configured to manage power consumption of a plurality of appliances, comprising:
    a plurality of appliances, each appliance configured with settings that include a threshold variable for determining a reaction of the respective appliance in response to reaching the threshold variable; and
    a plurality of controllers, each controller coupled to an associated appliance of the plurality of appliances, wherein the each controller configured to receive and process a signal that encodes a value from associated a utility to the associated appliance coupled to the controller, wherein each controller compares and compare the signal to the threshold variable of its associated appliance,
    wherein each appliance has a plurality of operating states including a first state of normal operation and a second state of energy savings operation,
    wherein, if the value is greater than the threshold variable of any of the plurality appliances, the controller coupled to the associated appliance changes operation of the appliance from its respective first state to its respective second state in response to the signal, where operation of one or more appliance functions is modified according to user settings so that said one or more appliance functions remains operational as prescribed by a user in a modified state when said appliance enters its respective second state, wherein, if the value is less than the threshold variable of any of the plurality appliances, the controller coupled to the associated appliance changes operation of the appliance from its respective second state to its respective first state when the signal from the utility is no longer being communicated to the appliance; and wherein each controller of the plurality of controllers implements a respective time delay preset buy the user before changing the operation of the associated appliance coupled to said controller from its respective second state to its respective first state so that all of the plurality of appliances operating in their respective second state are staggered in their return to operating in their respective first state.

2. The system according to claim 1, wherein the controller is part of a home energy management (HEM) system for managing the one or more threshold variables and for routing the signal from the associated utility to the appliance.

3. The system according to claim 1, wherein the first state of operation excludes any setting changes due to cost of energy to one or more power consuming functions.

4. The system according to claim 1, wherein the threshold variable is determined by a user and the value is selected from the group consisting of price of energy, carbon usage, maximum or minimum criticality level of demand, and a price tier number associated with current cost of energy.

* * * * *